United States Patent

[11] 3,566,016

[72] Inventor Albert Macovski
Palo Alto, Calif.
[21] Appl. No. 804,485
[22] Filed Mar. 5, 1969
[45] Patented Feb. 23, 1971
[73] Assignee RCA Corporation

[54] COLOR TELEVISION CAMERA ENCODING SYSTEM
24 Claims, 5 Drawing Figs.

[52] U.S. Cl. .......... 178/5.4, 350/162, 350/169
[51] Int. Cl. .......... H04n 9/06
[50] Field of Search .......... 178/5.4 (STC), 5.4 (F), 5.4; 350/169, 162; 325/329, 330, 49

[56] References Cited

UNITED STATES PATENTS 2,733,291 1/1956 Kell .......... 178/5.4(STC)
3,378,633 4/1968 Macovski .......... 178/5.4(STC)
3,419,692 12/1968 Macovski .......... 178/5.4(STC)
3,430,151 2/1969 Badessa .......... 325/329

*Primary Examiner*—Richard Murray
*Assistant Examiner*—Richard P. Lange
*Attorney*—Eugene M. Whitacre

ABSTRACT: A camera tube has two different color signal filter gratings, each with alternate color and neutral density parallel strips, and a reference signal grating of alternate transparent and neutral density strips. The numbers of strips in the three gratings are mutually different so that the frequencies of the waves resulting from the scanning of corresponding areas of the camera tube are mutually distinct and with the reference signal frequency bearing a specific relationship to each of the color signal modulated wave frequencies. The frequency of each color signal wave derived from the camera is multiplied an even number of times according to the specific relationship to produce a multiple color signal wave frequency of constant phase which is then mixed with a multiple of the reference signal frequency according to the specific relationship to produce waves at the respective frequencies of the original color signal waves but with no phase ambiguity. Each such wave is compared in a product detector with the corresponding original color signal modulated carrier wave to establish the correct polarity of the color signal. Each of the original color signal waves is separately envelope detected and the proper polarity of the detected signal is selected under the control of the output of the product detector for application to an output terminal.

Fig. I.

INVENTOR

Albert Macovski

BY Eugene M. Whitacre

ATTORNEY

INVENTOR
Albert Macovski

BY Eugene M. Whitacre
ATTORNEY

INVENTOR
Albert Macovski
BY Eugene M. Whitacre
ATTORNEY

COLOR TELEVISION CAMERA ENCODING SYSTEM

BACKGROUND OF THE INVENTION

Systems employing a camera tube provided with spatial filter gratings for producing color television video signals have previously been proposed as illustrated in U.S. Pat. No. 2,733,291 granted to R. D. Kell on Jan. 31, 1956 and in U.S. Pat. No. 3,378,633 granted to A. Macovski on Apr. 16, 1968. The color filter gratings used in such systems comprise, for example, strips of subtractive color selective filter material spaced apart by strips of transparent material. When light from a colored subject is projected onto the photosensitive electrode of the camera tube through the filter gratings, a color representative video signal is generated by scanning the electrode with an electron beam. The generated video signal is in the form of an amplitude modulated color carrier wave, the frequency of which depends upon the number of filter strips and the beam scanning rate, and the amplitude of which depends upon the intensity of the particular color light from the subject which is transmitted through the filter grating.

As taught in the Macovski patent, for example, the color signal encoding filter consists of two gratings, one of which has a first set of cyan filter strips for rejecting red light alternating with a second set of transparent strips; and the other of which has a first set of yellow filter strips for rejecting blue light alternating with a second set of transparent strips. The two gratings are superimposed and positioned so that the scansion by the electron beam of the respectively corresponding electrode areas produces in the camera tube output one carrier wave having a first frequency and modulated in amplitude by red subject light representative signals and another carrier wave having a second frequency and modulated in amplitude by blue subject light representative signals. The average light projected onto the photosensitive camera tube electrode produces in the camera tube output a relatively low frequency band of luminance or so-called Y signals. In order to develop so-called "color difference" signals (such as R-Y and B-Y for example) for transmission and/or reproduction of a color picture from the luminance signal Y and the red and blue signals R and B, the respective red and blue signal modulated carrier waves derived from the camera tube are detected and the recovered red and blue signals R and B are matrixed in a presently well-known manner with the derived Y signal to produce the desired (R-Y) and (B-Y) color difference signals.

It has been found that color difference signals may be derived directly from the camera tube, thereby obviating the use of a matrixing network to produce such signals as in systems such as that of the Kell and Macovski patents. This is accomplished by using material for the color selecting strips of the filter grating which passes all colors except the one desired for the color difference signal and by interspersing such color selective strips with strips of neutral density (gray) material in place of the previously used transparent material. The transmissivity of the gray and color selective strips of the gratings is equal for white light. By making one filter grating of alternate cyan and gray strips to produce a first frequency, a red color difference signal (R-Y) is generated as an amplitude modulation of a carrier having such first frequency. A blue color difference signal (B-Y) is similarly generated as an amplitude modulation of a carrier having a second frequency by means including a filter grating of alternate yellow and gray strips. Unlike the systems in which the alternating strips are transparent, the use of a neutral density material which matches the transmissivity of the color filter for white light results in the production of no carrier wave in response to neutral, or uncolored, areas of the subject. Hence, the color difference signals (R-Y) and (B-Y) are encoded as sidebands of two different suppressed carrier waves. The two color difference signals may be separately recovered by envelope detection of the two encoded carriers, but there is no way of determining whether the recovered signals represent the desired color difference signal or the inverse of it. In other words, there is a polarity ambiguity which must be resolved in order to make proper use of the recovered signals.

In a copending application Ser. No. 804,746 filed concurrently herewith and entitled "Television Color Difference Signal Encoding System" the reference signal required for demodulation of the color carrier waves requires a separate light source to image a reference grating onto the photosensitive electrode of a camera pickup tube. The grating image is superimposed on the photosensitive electrode by means of a mirror in the optical path of the camera, requiring the external light, reference grating and mirror to be in optical alignment.

An object of the present invention is to provide an improved electrical circuit system by which color difference signals may be recovered from the carrier waves derived from a camera tube such as that described without polarity ambiguity.

A further object of this invention is to provide an improved demodulation system for suppressed carrier signal modulated waves.

The unambiguous recovery of the signals derived from the camera tube (equipped with the two described color selective filter gratings) is accomplished by the use of a third grating comprising alternate transparent and neutral density strips to generate a reference signal having a frequency which bears a specific relationship to the color difference signal carrier frequencies. The reference signal frequency may or may not be intermediate the two color difference signal carrier frequencies. It is preferred that the reference frequency be intermediate the respective frequencies of the color difference signal carrier waves and that these frequencies be relatively low so as to avoid undue complication of the filter gratings and other apparatus used in their generation.

In the illustrative embodiment of the invention, each of the color difference signal carrier frequencies derived from the camera tube is multiplied by an even number. Because the color difference signal carrier frequency is multiplied by an even number, the multiplied wave will have a constant phase even though the original carrier wave frequency may be undergoing 180° phase shifts which represent different colors. The reference signal frequency which, according to the described specific relationship, is also multiplied to produce a wave which differs from one of the color difference signal wave frequencies by the frequency of the original color difference signal carrier wave. The color difference signal wave is mixed with the multiplied reference signal to produce an output wave of the original color difference signal carrier wave frequency and, since only multiplying and differencing operations are used in producing such an output wave, it will have a constant phase with no ambiguity.

A synchronous detector, to which are applied the original color difference signal modulated wave and the resultant wave of the same frequency produced by the described mixing operation, develops a signal indicative of the proper polarity of the color difference signal. The original color difference signal modulated wave is envelope detected and applied to a phase splitter, in the output of which both positive and negative polarities of the color difference signal are developed. The output from the synchronous detector controls a switch which operates to apply the correct polarity of the color difference signal from the phase splitter to an output terminal.

A similar processing of the other color difference signal modulated carrier wave derived from the camera tube is performed by other like apparatus.

For a more complete disclosure of the invention, reference may be had to the following detailed description of an illustrative embodiment which is given in conjunction with the accompanying drawings, of which:

Figure 1:
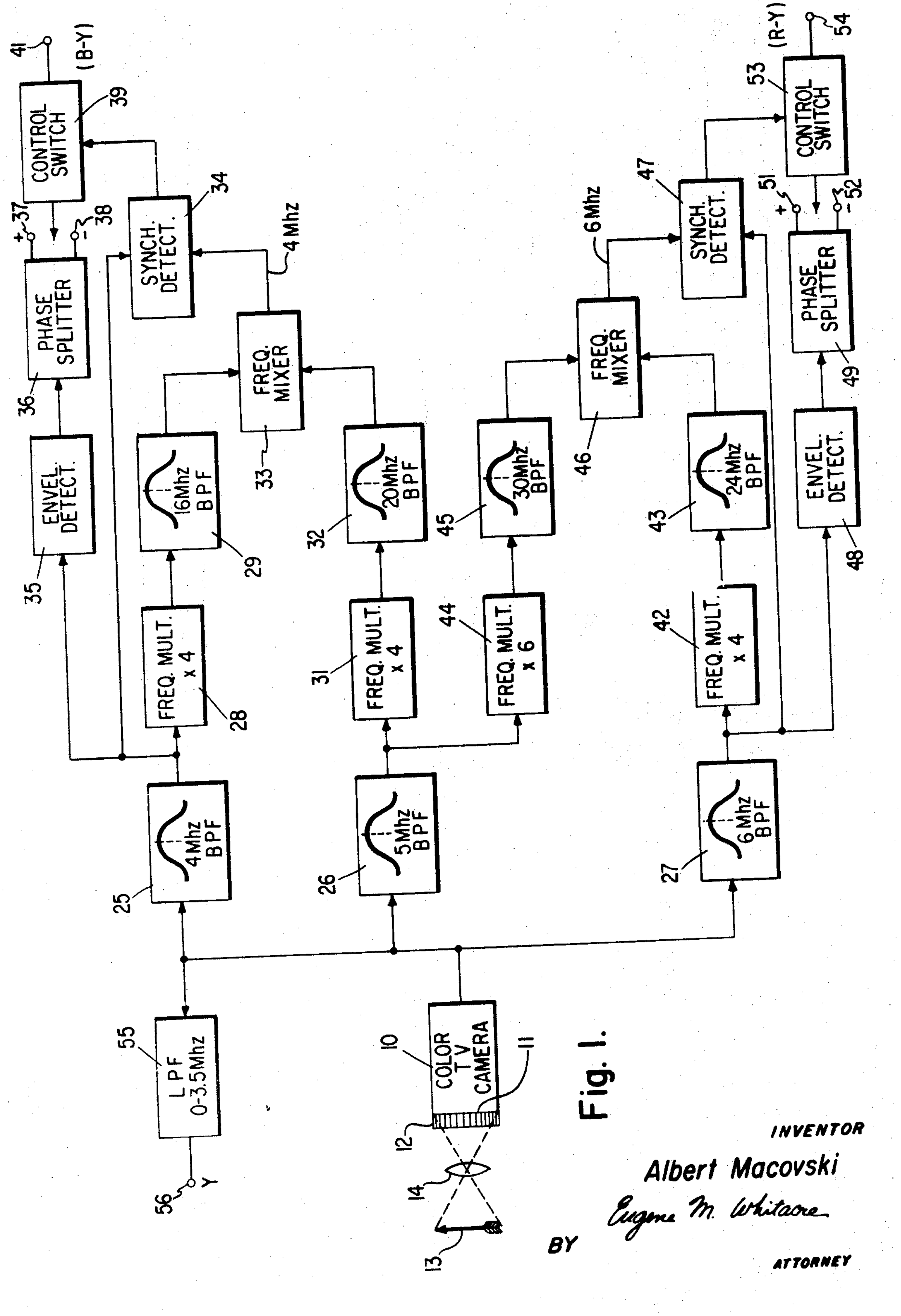
FIG. 1 is a block diagram of known components arranged in a circuit system embodying an illustrative form of the invention.

In FIG. 1 a color television camera includes a pickup tube 10, such as a vidicon for example, having an internally formed photosensitive electrode 11 and a color filter grating structure 12 located in an image plane which in this case is in direct contact with the faceplate of the tube so as to optically transmit light from a colored subject 13 which is focused thereon by suitable means including an optical system 14.

Figure 2:
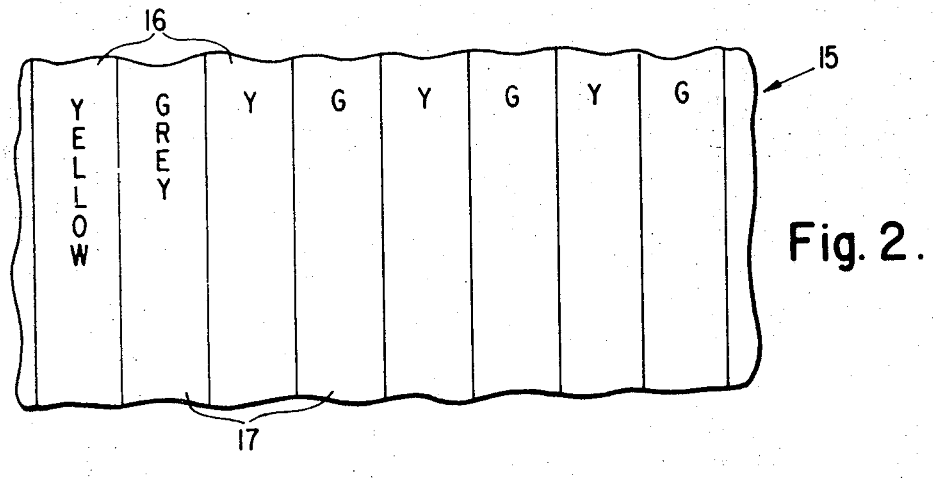
FIG. 2 is a fragmentary portion, greatly enlarged, of a color filter grating used in the production of (B-Y) color difference signals at a first carrier frequency.

The filter grating structure 12 includes three superimposed gratings 15, 18 and 22. FIG. 2 shows one arrangement of a (B-Y) color difference signal filter grating 15 in which relatively wide strips 16 of yellow color transmitting material are interspersed with strips 17 of equal width of neutral density material. The light transmitting properties of the filter strips 16 and 17 are such that any white light is passed in equal intensity through both sets of strips. Also, the strips have such widths and numbers that the scansion by an electron beam of the photosensitive electrode 11 at the normal television line scanning rate produces a (B-Y) color reference signal of 4 mHz.

Figure 3:
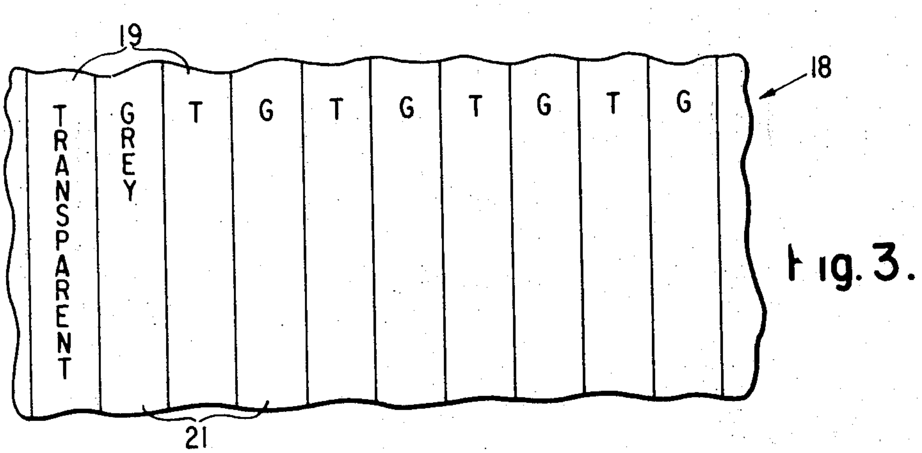
FIG. 3 is a fragmentary portion, greatly enlarged, of a reference signal grating used in the production of a reference signal having a second frequency bearing the specific relationship to the two color difference signal carrier frequencies.

The reference signal filter grating 18 of FIG. 3 comprises transparent strips 19 interspersed with neutral density strips. The strips of the grating 18 have been chosen in this illustrative example to have narrower widths than the strips of the grating 15 and to be greater in number so as to enable the generation of a reference signal frequency of 5 mHz.

Figure 4:
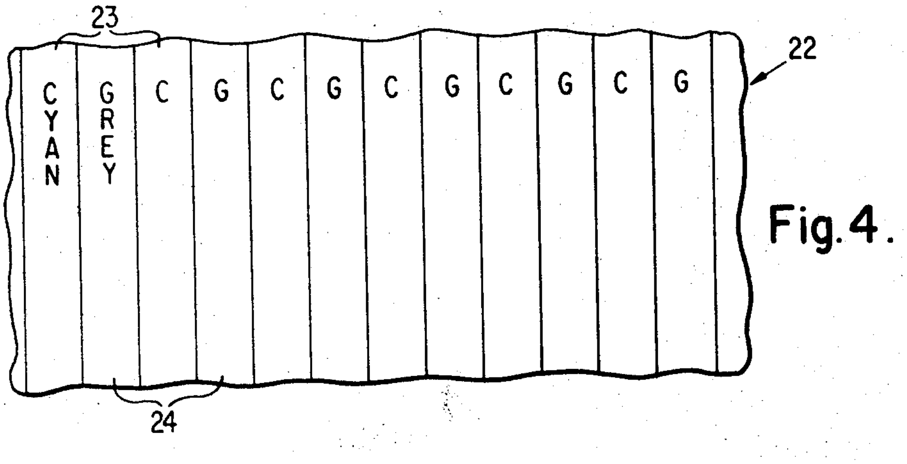
FIG. 4 is a fragmentary portion, greatly enlarged, of a color filter grating used in the production of (R-Y) color difference signals at a third carrier frequency.

The (R-Y) color difference signal filter grating 22 of FIG. 4 has a plurality of cyan strips 23 which are interspersed with equal width neutral density strips 24. The strips of the grating 22 are narrower than the strips of either of the gratings 15 and 18 of FIGS. 2 and 3 respectively, thereby enabling the generation of an (R-Y) color difference signal of 6 mHz.

The nature of the color grating structures is such that the output signal from the camera 10 comprises a low frequency video signal, a pair of carriers at 4 and 6 mHz. respectively modulated with the blue and red information and the 5 mHz. reference wave. The color information, because of the equal transmissivity of the grating strips to white light is represented as the sideband of an amplitude modulated suppressed carrier wave. Since the carrier wave is suppressed, envelope detection will not provide the desired output because of polarity ambiguity.

In FIG. 1, the 4 mHz. (B-Y) signal, the 5 mHz. reference signal and the 6 mHz. (R-Y) signal are passed respectively through band pass filters 25, 26 and 27 each having center frequencies corresponding to those of the respective waves derived from the camera tube 10. The 4 mHz. (B-Y) signal wave is applied to a (B-Y) frequency multiplier 28 which increases its frequency to 16 mHz. This is accomplished by multiplying the (B-Y) signal wave by a factor of 4 which, in accordance with the invention, is a multiplication of the original (B-Y) color difference signal wave frequency by 4. The 16 mHz. (B-Y) signal wave is then passed through a band pass filter 29 having a center frequency of 16 mHz.

The 5 mHz. reference signal wave derived from the band pass filter 26 is applied to a first reference signal frequency multiplier 31 which multiplies it by 4 to increase the frequency of the reference signal wave to 20 mHz. The 20 mHz. reference signal is passed through a band pass filter 32 having a center frequency of 20 mHz.

The 16 mHz. wave derived from the band pass filter 29 and the 20 mHz. reference signal wave derived from the band pass filter 32 are applied to a mixer 33 which produces in its output a difference wave of 4 mHz. frequency which is the same as that of the original carrier modulated by the (B-Y) color difference signal. As previously explained, this 4 mHz. difference wave will have a constant phase because of the multiplication of the (B-Y) carrier wave by an even number in the multiplier 28, even though the original carrier derived from the camera tube 10 may be undergoing 180° phase shifts.

The constant phase 4 mHz. wave derived from the mixer 33 is compared with the original (B-Y) carrier derived from the band pass filter 25 in a product or synchronous detector 34 which produces in its output signal which is indicative of the correct phase of the (B-Y) carrier. The original (B-Y) carrier derived from the band pass filter 25 is demodulated by an envelope detector 35, the output of which is applied to a phase splitter 36. Positive and negative polarities of the (B-Y) color difference signal appear at terminals 37 and 38 respectively of the phase splitter 36. A switch 39, which is controlled by the phase indicating signal derived from the synchronous detector 34, connects the (B-Y) output terminal 41 to the proper one of the opposite polarity terminals 37 and 38 of the phase splitter so that there is no ambiguity in the (B-Y) color difference signal derived from the output terminal 41.

In a similar manner, the circuit system of FIG. 1 also functions to produce an (R-Y) color difference signal with no ambiguity by using the same reference signal as employed in the derivation of the (B-Y) signal. The 6 mHz. (R-Y) signal derived from the band pass filter 27 is applied to a frequency multiplier 42 which multiplies the color difference signal carrier by a factor of 4. The resultant 24 mHz. carrier wave is passed through a band pass filter 43 which has a center frequency of 24 mHz.

The 5 mHz. reference signal wave derived from the filter 26 is applied to a second frequency multiplier by which it is multiplied by a factor of 6. The 30 mHz. reference signal wave thus produced by the a multiplier 44 is passed through a band pass filter 45 having a center frequency of 30 mHz.

The 24 mHz. wave from the filter 43 and the 30 mHz. reference signal wave from the filter 45 are impressed upon a mixer 46 which produces in its output a wave of 6 mHz. frequency which is the same as that of the original (R-Y) carrier and having a constant phase. This wave is compared with the original color difference signal modulated carrier derived from the filter 27 in a product or synchronous detector 47 to produce an output signal indicative of the correct phase of the (R-Y) carrier. The original (R-Y) carrier wave derived from the filter 27 is demodulated by an envelope detector 48, the output of which is applied to a phase splitter 49 to develop positive and negative polarities of the demodulated signal respectively at terminals 51 and 52. The correct phase indicating signal from the synchronous detector 47 controls a switch 53 so as to produce an (R-Y) color difference signal with no ambiguity at an output terminal 54.

The composite signal derived from the camera tube 10 represents a combination of all of the light received by the photosensitive electrode 11 from the subject 12, and thus, comprises the brightness gradations of the subject. Such a signal is derived directly from the camera tube 10 and is applied through a low pass filter 55 to an output terminal 56 from which it is available as a brightness or so-called Y signal which may be combined or matrixed with the (B-Y) and (R-Y) color difference signals developed respectively at terminals 41 and 54 to produce signals suitable for reproduction of the colored subject 12 or for transmission to remote points for processing in a well known manner. Preferably, the low pass filter 55 has a frequency pass band from 0 mHz. to approximately 3.5 mHz. so as to exclude from the Y signal the frequencies of the waves generated by means including the spatial filter structure 12.

It will be understood that the circuit system of FIG. 1 and the described mode of its operation is intended to illustrate the principle of the invention in a presently preferred embodiment. In the present system, however, somewhat improved performance may be obtained by suitably limiting the outputs of all of the band pass filters except the filters 25 and 27 which supply the color difference signal modulated carrier waves to the envelope detectors 35 and 48, respectively, so as to generate a reference signal of maximum uniformity. Except for the filters 25 and 27, only waves of the designated frequencies from the other filters are significant and it is preferred that such waves have a minimum, if any, modulation.

Also, the respective planes of the reference and color difference signal gratings 15, 18 and 22 respectively of FIGS. 2, 3 and 4 must all be at the same angle relative to the camera tube 10 and its optical system 14 so as to insure the maintenance of a constant phase relationship of the waves developed therefrom. Of the numerous possible arrangements of the filter gratings, a convenient one is to place all three in the same image plane with the strips of the respective gratings parallel to one another and having such widths for generating wave frequencies in the ratio of 4 to 5 to 6 as shown and described.

Alternatively, the gratings can be mounted in a shadowing arrangement with an additional grating having alternating transparent and thickness or neutral density strips located on the outside surface of the faceplate of the camera tube 10. The number of strips per inch produce a carrier having a frequency N, hereinafter called a spatial frequency. The gratings for the (B-Y), (R-Y) and reference signals waves, in such case, are relatively coarse and are exactly spaced with spatial frequencies $Nb$, $Nr$ and $Nref$ respectively. The three coarse gratings are arranged so the that $N1-Nb$, $N1-$Nref and $N1-Nr$ are in the ratio of 4 to 5 to 6 as assumed for the generated waves because these spatial frequency differences determine the spatial frequencies shadowed onto the photosensitive electrode 11 of the camera tube 10. The axial spacing $X$ of each grating $N$ from the electrode 11 is represented by the expression $X=(N1/N)d$ where $d$ is the effective thickness (in air) of the faceplate of the camera tube 10.

In the generation of a reference signal having a frequency which is $(2n+1)/m$ times the frequency of each color difference signal carrier wave, the assumed values of $n=2$ and $m=4$ for the (B-Y) wave and $m'=6$ for the (R-Y) wave were chosen to illustrate one practical embodiment of the invention. The general principle of the invention may, however, be applied to other embodiments having similar circuit arrangements but operating at different frequencies. Having chosen a relationship such as the 4 to 5 to 6 ratio between the frequencies of the waves to be generated other frequencies may be used with the same arrangement. For example, the frequencies of the (B-Y), the reference signal and the (R-Y) waves may be 2 mHz., 2.5 mHz. and 3 mHz. respectively which, it is seen seen, are in the ratio of 4 to 5 to 6.

Also, in accordance with the principle of the invention, other ratios and other values of the factors $n$ and $m$ may be used. For example, suppose that the (B-Y), the reference signal and the (R-Y) waves are 2.5 mHz., 3.5 mHz. and 4.5 mHz. respectively which are in the ratio of 5 to 7 to 9. In such a case, $n=3$, $m=5$ and $m'=9$. It is seen that the essential relationship of the invention is satisfied by such an arrangement in that the reference frequency of 3.5 mHz. is equal to $(2n+1)/m$ for the (B-Y) wave of 2.5 mHz. when $m=5$ and also for the (R-Y) wave of 4.5 mHz. when $m'=9$.

It will be recognized that low frequency beats between the generated waves, including the color difference signal carrier waves and the reference signal wave, may appear as spurious signals in the luminance signal channel. If these beat frequencies are found to be objectionable, they may be canceled by any one of a number of known means. For example, three product or synchronous detectors may be used, each with two of the three waves as inputs, to develop signals which have the undesired beat frequencies and which may be applied in suitable polarity and amplitude to the luminance signal channel to effect the desired cancellation. Alternatively, a less costly, but also a less precise, arrangement would be to use a high pass filter which would pass all of the high frequency waves to an envelope detector, in the output circuit of which would be produced all of the beat frequencies in approximately the correct proportions to cancel the undesired beat frequencies from the luminance signal channel.

It should be apparent from the foregoing disclosure that the particular circuit system of FIG. 1 is merely illustrative of a presently preferred arrangement for processing the signal waves derived from the camera tube 10. For example, assuming the original 4 mHz., 5 mHz. and 6 mHz. frequencies respectively for the (B-Y), reference and (R-Y) waves, it may be found desirable to produce the 4 mHz. and 6 mHz. reference waves for synchronously detecting the 4 mHz. (B-Y) and the 6 mHz. (R-Y) color difference waves by a circuit arrangement such as that shown in FIG. 5, in which apparatus similar to corresponding apparatus of FIG. 1 is designated by the same reference characters in both FIGS.

The 4 mHz., 5 mHz. and 6 mHz. waves derived respectively from the band pass filters 25, 26 and 27 are each multiplied by a factor of 2 in the frequency multipliers 57, 58 and 59 to double the respective wave frequencies. The doubled frequency (B-Y) and reference waves derived from the multipliers 57 and 58 are passed respectively through 8 mHz. and 10 mHz. band pass filters 61 and 62 to a frequency mixer 63, the 2 mHz. difference frequency output of which is passed through a 2 mHz. band pass filter 64 to a frequency multiplier 65 in which it is multiplied by a factor of 2 to produce a 4 mHz. wave of constant phase irrespective of any 180° phase shifts which the original wave from the camera tube may be undergoing. This wave is applied to the synchronous detector 34 together with the original 4 mHz. (B-Y) wave as in the arrangement of FIG. 1 to control the polarity of the (B-Y) signal output to terminal 41 as described.

Similarly, the doubled frequency (R-Y) wave from the multiplier 59 is passed through a band pass filter 66 to a frequency mixer 67 to which also is applied the doubled frequency reference wave from the filter 62 to produce a 2 mHz. difference frequency wave which, after being passed through a band pass filter 68, is multiplied by a factor of 3 in a frequency multiplier 69 to produce a 6 mHz. wave of constant phase for comparison in the synchronous detector 47 with the original 6 mHz. (R-Y) wave to control the polarity of the (R-Y) signal developed at the output terminal 54.

Figure 5:
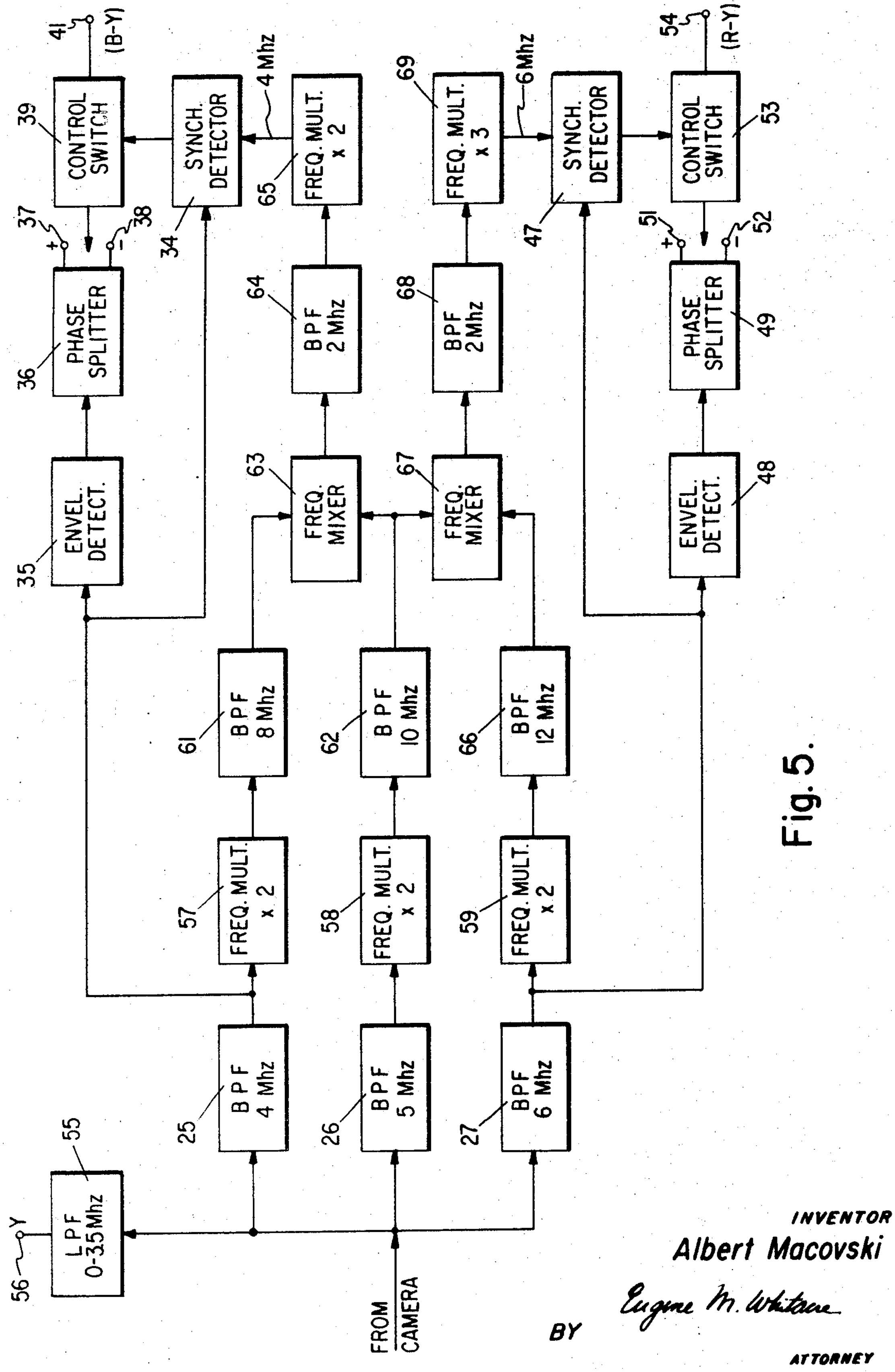
FIG. 5 is a block diagram of known components arranged in a circuit embodying an alternative form of the invention.

While the use of the entire apparatus of either FIGS. 1 or 5 produces the best results and such apparatus, therefore, represents the presently preferred embodiments of the invention, the apparatus may be simplified somewhat by omitting the envelope detectors 35 and 48, the phase splitters 36 and 49 and the control switches 39 and 53 from FIGS. 1 and 5. In the resulting arrangement, the (B-Y) and the (R-Y) signals may be derived directly from the respective synchronous detectors 34 and 47. A disadvantage of such a simplified system is that any imperfection of the reference signal tends to produce "phase noise" in the output of the synchronous detector.

The nature of the invention, having been described in the foregoing disclosure of two illustrative embodiments and modifications thereof, its scope is defined in the following claims.

I claim:

1. A demodulator comprising:
   - first means providing a signal wave to be demodulated;
   - second means for multiplying said signal wave by an even number;
   - third means for generating a reference wave bearing a predetermined phase relation relative to said signal wave;
   - fourth means responsive to said reference wave and to said multiplied signal wave for deriving a resultant wave of constant phase and having a frequency equal to that of said signal wave before multiplication;
   - fifth means for producing positive and negative polarity signals representative of said signal wave envelope;
   - sixth means responsive to said signal wave and said resultant wave derived in said fourth means for producing an indicating signal indicative of which polarity of said signal wave represents the desired signal information; and
   - seventh means responsive to said indicating signal for selecting the one of said positive and negative polarity signals containing the desired signal information.

2. In a system in which a signal is produced in the form of an amplitude modulated suppressed carrier wave of frequency $Fc$ and having a polarity ambiguity of its envelope because of the suppression of the carrier wave, an unambiguous encoding system, comprising:

means for generating a first reference signal wave having a frequency $Fref$ which equals $(2n+1)/m$ times the frequency $Fc$ of said carrier wave, where the factor $n$ is any integer and the factor $m$ is any integer;

first multiplying means for multiplying the frequency $Fc$ of said carrier wave by an even multiple of the factor $n$ to produce an even harmonic of said carrier wave;

second multiplying means for multiplying the frequency $Fref$ by said factor $m$ to produce a second reference signal wave having a frequency differing from that of said harmonic wave by a frequency related by an integer including 1 to said carrier wave frequency $Fc$;

combining means for combining said harmonic wave with said second reference signal wave to produce a constant phase unambiguous wave having a frequency related by an integer including 1 to said carrier wave frequency $Fc$;

comparison means for comparing said constant phase unambiguous wave with said signal modulated carrier wave of frequency $Fc$ to produce an indicating signal representative of the correct phase of said signal modulated carrier wave;

detection means for producing positive and negative demodulated polarities of said carrier wave envelope; and selection means controlled by said indicating signal for selecting the proper one of said carrier wave envelope polarities to produce the desired signal information of unambiguous polarity.

3. In a color television system in which a color difference signal is produced in the form of an amplitude modulated suppressed carrier wave of a frequency $Fc$ and having a polarity ambiguity of the envelope of the produced wave because of the suppression of the carrier wave, an unambiguous encoding system, comprising:

means for generating a reference signal wave having a frequency $Fref$ which equals $(2n+1/m)$ times the frequency $Fc$ of said carrier wave, where the factor $n$ is any integer and the factor $m$ equals $(2n+1)Fc/Fref$;

means for producing even harmonics of said carrier and reference signal waves;

means for combining said harmonic carrier and reference signal waves to produce a constant phase unambiguous wave having a frequency which is related by an integer including 1 to said carrier wave frequency $Fc$;

means employing said unambiguous wave and said signal modulated carrier wave of frequency $Fc$ to produce an indicating signal representative of the correct phase of said signal modulated carrier wave;

means for producing positive and negative polarities of said carrier wave envelope constituting said color difference signal; and means controlled by said indicating signal to produce an output color difference signal of unambiguous polarity from one of said carrier wave polarities.

4. In a color television system, an unambiguous encoding system as defined in claim 1, wherein:

said even harmonics of said carrier and reference signal waves differ by a subharmonic of said carrier wave frequency $Fc$;

said combining means comprises a mixer responsive to said even harmonics of said carrier and reference signal waves to produce a difference frequency wave having said subharmonic of said carrier wave frequency $Fc$; and means for multiplying said difference frequency wave derived from said mixer by a factor suitable to produce said constant phase unambiguous wave having a frequency which is related by an integer including 1 to said carrier wave frequency $Fc$.

5. The unambiguous encoding system as defined in claim 2, wherein:

said detection means includes an envelope detector responsive to said signal modulated carrier wave to derive a signal indicative of one envelope of said carrier wave; and a phase splitter coupled to said envelope detector for developing at respective output terminals positive and negative polarities of said derived signal.

6. The unambiguous encoding system as defined in claim 5, wherein: said selection means comprises a switch operable to effectively connect the derived signal output terminal to either of the output terminals of said phase splitter under the control of said indicating signal derived from said comparison means.

7. The unambiguous encoding system as defined in claim 2, wherein:

said second reference signal wave produced by said second multiplying means differs from said even harmonic of said carrier wave by said carrier wave frequency $Fc$; and said combining means comprises a mixer responsive to said second reference signal wave and to said even harmonic of said carrier wave to produce a difference frequency wave having said carrier wave frequency.

8. The unambiguous encoding system as defined in claim 5, wherein: said comparison means comprises a synchronous detector responsive to said difference frequency wave having said carrier wave frequency $Fc$ derived from said combining means and to said color difference signal modulated carrier wave to produce said correct phase indicating signal.

9. In a color television system in which a first color difference signal is produced in the form of a first amplitude modulated suppressed carrier wave of frequency $Fc1$ and a second color difference signal is produced in the form of a second amplitude modulated suppressed carrier wave of frequency $Fc2$, each of said carrier waves having a polarity ambiguity of their respective envelopes because of the suppression of the respective carrier waves, an unambiguous encoding system, comprising:

means for generating a reference signal wave having a frequency $Fref$ which equals $(2n+1)/m$ times each of the frequencies $Fc1$ and $Fc2$ of the respective first and second carrier waves, where the factor $n$ is any integer and the factor $m$ is an integer which in one case equals $(2n+1Fc1/Fref$ and in the second case equals $(2n+1)Fc2/Fref$;

means for producing even harmonics of each of said carrier waves frequencies $Fc1$ and $Fc2$ and of said reference signal wave frequency $Fref$;

combining means for separately combining said harmonic reference signal wave with said respective harmonic carrier waves to produce two constant phase unambiguous waves, each having a frequency related by an integer including 1 to its associated carrier wave frequency $Fc1$ and $Fc2$;

signal producing means employing said two unambiguous waves and the associated signal modulated carrier waves of said frequencies $Fc1$ and $Fc2$ to produce two indicating signals representative respectively of the correct phases of said signal modulated carrier waves;

means for producing positive and negative polarities of each of said carrier wave envelopes constituting said respective color difference signals; and means controlled by said two indicating signals to select the proper polarity of each of said carrier wave envelopes to produce said respective first and second color difference signals having no polarity ambiguity.

10. In a color television system, an unambiguous encoding system as defined in claim 9, wherein: said first carrier wave frequency $Fc1$, said reference signal wave frequency $Fref$ and said second carrier wave frequency $Fc2$, respectively, are in the ratio of 4 to 5 to 6.

11. In a color television system, an unambiguous encoding system as defined in claim 10, wherein: said means for producing said even harmonics of said carrier and reference signal waves comprise a plurality of frequency multiplying means.

12. In a color television system, an unambiguous encoding system as defined in claim 11, wherein:

said frequency multiplying means for said first and second carrier waves comprise first and second multipliers, each operative to multiply its associated carrier wave by a factor of $2n$; and said frequency multiplying means for said reference signal wave comprise a first multiplier operative to multiply said reference signal wave by a factor of $m$ equals $(2n+1)Fc1/Fref$ to produce a first reference signal harmonic frequency, and a second multiplier operative to multiply said reference signal wave by a second factor of $m$ equals $(2n+1Fc2/Fref$.

13. In a color television system, an unambiguous encoding system as defined in claim 12, wherein: said combining means comprise a first mixer responsive to said first carrier wave harmonic frequency and to said first reference signal harmonic frequency to produce said unambiguous wave related to said first carrier wave $Fc1$, and a second mixer responsive to said second carrier wave harmonic frequency and to said second reference signal harmonic frequency to produce said unambiguous wave related to said second carrier wave $Fc2$.

14. In a color television system, an unambiguous encoding system as defined in claim 13, where: said signal producing means comprise a first synchronous detector responsive to said unambiguous wave related to said first carrier wave $Fc1$ and to said color difference signal modulated carrier wave $Fc1$ to produce a first indicating signal representative of the correct phase of said modulated carrier wave $FC1$, and a second synchronous detector responsive to said unambiguous wave related to said second carrier wave $Fc2$ and to said color difference signal modulated carrier wave $Fc2$ to produce a second indicating signal representative of the correct phase of said modulated carrier wave $Fc2$.

15. In a color television system, an unambiguous encoding system as defined in claim 14, wherein:

said means for producing positive and negative polarities of said carrier wave envelopes includes a first envelope detector responsive to said color difference signal modulated carrier wave $Fc1$ to produce said first color difference signal, and a second envelope detector responsive to said color difference signal modulated wave $Fc2$ to produce said second color difference signal; and a first phase splitter coupled to said first envelope detector for developing at respective output terminals thereof positive and negative polarities of said first color difference signal, and a second phase splitter coupled to said second envelope detector for developing at respective output terminals thereof positive and negative polarities of said second color difference signal.

16. In a color television system, an unambiguous encoding system as defined in claim 15, wherein: said means to select the proper polarity of each of said color difference signals comprise a first switch responsive to said first indicating signal to connect the proper one of the output terminals of said first phase splitter to a first signal output terminal to produce thereat an unambiguous first color difference signal, and a second switch responsive to said second indicating signal to connect the proper one of the output terminals of said second phase splitter to a second signal output terminal to produce thereat an unambiguous second color difference signal.

17. In a color television system in which a color difference signal is produced in the form of an amplitude modulated suppressed carrier wave of frequency $Fc$ and having polarity ambiguity of its envelope because of the suppression of the carrier wave, an unambiguous encoding system, comprising:

means for generating a reference signal having a frequency $Fref$ which equals $(2n+1)m$ times the frequency $Fc$ of said carrier wave, where the factor $n$ is any integer and the factor $m$ is any integer;

first multiplying means for doubling the frequency $Fc$ of said carrier wave and the frequency $Fref$ of said reference signal;

combining means for combining said doubled frequency carrier wave with said doubled frequency reference signal to produce a first constant phase unambiguous wave having a frequency which is a submultiple of said carrier wave frequency $Fc$;

second multiplying means for multiplying said constant phase unambiguous wave by a factor suitable to produce a second constant phase unambiguous wave having the frequency $Fc$ of said original signal modulated carrier wave;

comparison means for comparing said second constant phase unambiguous wave with said signal modulated wave of frequency $Fc$ to produce an indicating signal representative of the correct phase of said signal modulated carrier wave;

detection means for producing positive and negative demodulated polarities of said carrier wave envelope constituting said color difference signal; and selection means controlled by said indicating signal for selecting the proper one of said carrier wave envelope polarities to produce an output color difference signal of unambiguous polarity.

18. In a color television system, an unambiguous encoding system as defined in claim 17, wherein:

said detection means includes an envelope detector responsive to said color difference signal modulated carrier wave to produce a demodulated color difference signal; and a phase splitter coupled to said envelope detector for developing at respective output terminals positive and negative polarities of said demodulated color difference signal.

19. In a color television system, an unambiguous encoding system as defined in claim 18, wherein: said selection means comprises a switch operable to effectively connect a color difference signal output terminal to either of the output terminals of said phase splitter under the control of said indicating signal derived from said comparison means.

20. In a color television system, an unambiguous encoding system as defined in claim 19, wherein: said comparison means comprises a synchronous detector responsive to said second constant phase unambiguous wave having said carrier wave frequency $Fc$ derived from said second multiplying means and to said original color difference signal modulated carrier wave to produce said correct phase indicating signal.

21. In a color television system in which a first color difference signal is produced in the form of a first amplitude modulated suppressed carrier wave of frequency $Fc1$ and a second color difference signal is produced in the form of a second amplitude modulated suppressed carrier wave of frequency $Fc2$, each of said carrier waves having a polarity ambiguity of their respective envelopes because of the suppression of the respective carrier waves, an unambiguous encoding system, comprising:

means for generating a reference signal wave having a frequency $Fref$ which equals $(2n+1)/m$ times each of the frequencies $Fc1$ and $Fc2$ of the respective first and second carrier waves, where the factor $n$ is any integer and the factor $m$ is two different integers;

first multiplying means for doubling each of said carrier wave frequencies $Fc1$ and $Fc2$ and said reference signal wave frequency $Fref$ to produce waves having frequencies of $2Fc1$, $2Fc2$ and $2Fref$, respectively;

combining means for separately combining said doubled frequency reference signal wave $2Fref$ with said respective doubled frequency carrier waves $2Fc1$ and $2Fc2$ to produce two first constant phase unambiguous waves, each having a frequency which is a submultiple of its associated carrier wave frequency;

second multiplying means for multiplying said two first constant phase unambiguous waves derived from said combining means by suitable respective factors to produce two second constant phase unambiguous waves, respectively having the frequencies $Fc1$ and $Fc2$ of said original signal modulated waves;

signal producing means employing said two second unambiguous waves and the associated signal modulated carrier waves of said frequencies $Fc1$ and $Fc2$ to produce two indicating signals representative respectively of the correct phases of said signal modulated carrier waves;

means for producing positive and negative polarities of each of said carrier wave envelopes constituting said respective color difference signals; and means controlled by said two indicating signals to select the proper polarity of each of said carrier wave envelopes to produce said respective first and second color difference signals having no polarity ambiguity.

22. In a color television system, an unambiguous encoding system as defined in claim 21, wherein;

said first carrier wave frequency $Fc1$, said reference signal frequency $Fref$ and said second carrier wave frequency $Fc2$, respectively, are in the ratio of 4 to 5 to 6; and said combining means comprise a first mixer responsive to said doubled frequency waves of frequencies $2Fc1$ and $2Fref$ to produce a first constant phase unambiguous wave having a subharmonic frequency of said first carrier wave frequency $Fc1$, and a second mixer responsive to said doubled frequency waves of frequencies $2Fc2$ and $2Fref$ to produce a second constant phase unambiguous wave having a subharmonic frequency of said second carrier wave frequency $Fc2$.

23. In a color television system, an unambiguous encoding system as defined in claim 22, wherein: said signal producing means comprise a first synchronous detector responsive to said second constant phase unambiguous wave of frequency $Fc1$ and to said first color difference signal modulated carrier wave of frequency $Fc1$ to produce a first indicating signal representative of the correct phase of said modulated carrier wave of frequency $Fc1$, and a second synchronous detector responsive to said second constant phase unambiguous wave of frequency $Fc2$ and to said second color difference signal modulated carrier wave of frequency $Fc2$ to produce a second indicating signal representative of the correct phase of said modulated carrier wave of frequency $Fc2$.

24. In a color television system in which a color difference signal is produced in the form of an amplitude modulated suppressed carrier wave of a frequency $Fc$ and having a polarity ambiguity of the envelope of the produced wave because of the suppression of the carrier wave, an unambiguous decoding system, comprising:

means for generating s a reference signal wave having a frequency $Fref$ which equals $(2n+1)/m$ times the frequency $Fc$ of said carrier wave, where the factor $n$ is any integer and the factor $m$ is any integer;

means for producing even harmonics of said carrier and reference signal waves;

means for combining said harmonic carrier and reference signal waves to produce a constant phase unambiguous wave having said carrier wave frequency $Fc$; and means employing said unambiguous wave and said signal modulated carrier wave of frequency $Fc$ to produce an output color difference signal of unambiguous polarity.